(12) United States Patent
Hedblom

(10) Patent No.: US 11,084,077 B2
(45) Date of Patent: Aug. 10, 2021

(54) TUBE STRUCTURE AND A METHOD FOR MANUFACTURING A TUBE STRUCTURE

(71) Applicant: SANDVIK INTELLECTUAL PROPERTY AB, Sandviken (SE)

(72) Inventor: Erika Hedblom, Valbo (SE)

(73) Assignee: Sandvik Intellectual Property AB, Sandviken (SE)

( * ) Notice: Subject to any disclaimer, the term of this patent is extended or adjusted under 35 U.S.C. 154(b) by 93 days.

(21) Appl. No.: 16/622,492

(22) PCT Filed: Jun. 15, 2018

(86) PCT No.: PCT/EP2018/065979
§ 371 (c)(1),
(2) Date: Dec. 13, 2019

(87) PCT Pub. No.: WO2018/229262
PCT Pub. Date: Dec. 20, 2018

(65) Prior Publication Data
US 2021/0146418 A1    May 20, 2021

(30) Foreign Application Priority Data

Jun. 16, 2017   (EP) .................................... 17176418

(51) Int. Cl.
*F16L 9/18* (2006.01)
*B21C 37/15* (2006.01)
(Continued)

(52) U.S. Cl.
CPC .............. *B21C 37/154* (2013.01); *B21C 1/24* (2013.01); *F16L 9/02* (2013.01); *F16L 9/18* (2013.01); *F16L 53/37* (2018.01)

(58) Field of Classification Search
CPC .... F16L 9/18; F16L 9/02; F16L 53/37; G01M 3/16; G01M 3/18
(Continued)

(56) References Cited

U.S. PATENT DOCUMENTS 2,440,245 A * 4/1948 Chevigny ............... H01J 19/36
165/80.4
6,926,039 B2 * 8/2005 Marion .................. F16L 11/081
138/114
(Continued)

FOREIGN PATENT DOCUMENTS

DE          3706408 C1     5/1988
DE     102012021415 B3     1/2014
(Continued)

OTHER PUBLICATIONS

Notice of Grounds for Rejection dated Aug. 28, 2020 in Korean Application No. 10-2020-7000048.
(Continued)

*Primary Examiner* — Patrick F Brinson
(74) *Attorney, Agent, or Firm* — Morgan, Lewis & Bockius LLP

(57) ABSTRACT

The present disclosure relates to a tube structure comprising an inner tube of metal and an outer tube of metal, wherein the inner tube extends in the outer tube, and wherein either the inner tube and the outer tube are mechanically tight fitted over the entire length of the inner tube, at least one space in a radial direction of the tube structure in the form of a groove extends at least in an outer surface of the inner tube or in an inner surface of the outer tube, and the at least one space extends in a longitudinal direction of the inner tube and over an entire longitudinal extension of the inner tube, or a spacer tube is located between the inner tube and the outer tube, the inner tube, the outer tube and the spacer tube are mechanically tight fitted over the entire length of the spacer tube, the (Continued)

spacer tube comprises at least one space in the form a slit extending in a radial direction of the tube structure from an outer surface of the inner tube to an inner surface of the outer tube, the at least one space extends in a longitudinal direction of the spacer tube and over an entire longitudinal extension of the spacer tube, and wherein the at least one space is at least partially filled with a thermal interface material providing a thermal contact between the outer tube and the inner tube.

17 Claims, 2 Drawing Sheets

(51) Int. Cl.
  *B21C 1/24* (2006.01)
  *F16L 53/37* (2018.01)
  *F16L 9/02* (2006.01)
(58) Field of Classification Search
  USPC ............ 138/114, 115, 117, 103, 148, 143, 138/137–139
  See application file for complete search history.

(56) References Cited

U.S. PATENT DOCUMENTS

| | | | | |
|---|---|---|---|---|
| 8,256,469 B2* | 9/2012 | Felix-Henry | ......... | E21B 17/015 138/114 |
| 10,197,212 B2* | 2/2019 | Green | ................ | F16L 59/143 |
| 10,962,148 B2* | 3/2021 | Glejbol | ................ | G01M 3/38 |
| 2009/0139596 A1* | 6/2009 | Kuyl | ...................... | G01M 3/283 138/148 |
| 2009/0214196 A1* | 8/2009 | Bremnes | ............. | H05B 3/0009 392/480 |
| 2010/0126986 A1* | 5/2010 | Gunzing | ............... | F16L 11/085 219/643 |
| 2014/0332191 A1 | 11/2014 | Jarmon | | |
| 2015/0111082 A1 | 4/2015 | Sumpf et al. | | |
| 2016/0312924 A1* | 10/2016 | Kolarski | ................. | F16L 53/37 |

FOREIGN PATENT DOCUMENTS

| | | | |
|---|---|---|---|
| EP | 3321553 A1 * | 5/2018 | .............. F16L 53/37 |
| GB | 728131 A | 4/1955 | |
| GB | 2117281 A | 10/1983 | |
| WO | 98/22769 A1 | 5/1998 | |
| WO | 2007120642 A2 | 10/2007 | |
| WO | 2014200150 A1 | 12/2014 | |
| WO | 2017/102227 A1 | 6/2017 | |

OTHER PUBLICATIONS

International Search Report and Written Opinion dated Sep. 28, 2018, issued in corresponding International Patent Application No. PCT/EP2018/065979.
Canadian Office Action dated Jun. 2, 2020 issued in CA Patent Application 3,066,324.
Canadian Office Action dated Jan. 28, 2020 issued in CA Patent Application 3,066,324.

* cited by examiner

TUBE STRUCTURE AND A METHOD FOR MANUFACTURING A TUBE STRUCTURE

The present disclosure relates to a tube structure comprising an inner tube of metal and an outer tube of metal, wherein the inner tube extends in the outer tube, and wherein either the inner tube and the outer tube are mechanically tight fitted over the entire length of the inner tube, at least one space in a radial direction of the tube structure in the form a groove extends at least in an outer surface of the inner tube or in an inner surface of the outer tube, and the at least one space extends in a longitudinal direction of the inner tube and over an entire longitudinal extension of the inner tube, or a spacer tube is located between the inner tube and the outer tube, the inner tube, the outer tube and the spacer tube are mechanically tight fitted over the entire length of the spacer tube, the spacer tube comprises at least one space in the form of a slit extending in a radial direction of the tube structure from an outer surface of the inner tube to an inner surface of the outer tube, and the at least one space extends in a longitudinal direction of the spacer tube and over an entire longitudinal extension of the spacer tube.

The present disclosure further relates to a method for manufacturing a tube structure comprising the steps
  providing an inner tube of metal,
  providing an outer tube of metal, and either
  inserting the inner tube into the outer tube such that the inner tube extends in the outer tube,
  providing at least one space in the form of a groove extending in a radial direction of the tube structure at least in an outer surface of the inner tube or in an inner surface of the outer tube, wherein the at least one space extends in a longitudinal direction of the inner tube and over an entire longitudinal extension of the inner tube,
  mechanically tight fitting the inner tube and the outer tube over the entire length of the inner tube,
or
  providing a spacer tube with at least one space in the form of a slit extending in a longitudinal direction of the spacer tube,
  mounting the spacer tube on an outer surface of the inner tube and
  inserting the inner tube and the spacer tube into the outer tube such that the inner tube and the spacer tube extend in the outer tube and such that at least one space extends in a radial direction of the tube structure between the outer surface of the inner tube and an inner surface of the outer tube, and
  mechanically tight fitting the inner tube, the outer tube and the spacer tube over the entire length of the spacer tube.

Tube structures comprising at least an inner tube and an outer tube of metal, which are mechanically tight fitted to each other and wherein an additional space is provided between the inner tube and the outer tube in order to accommodate a signal line and/or a sensor are known.

However, it has turned out that although the space provided is partially filled by the material of the signal line and/or the sensor air gaps are formed in the space preventing a sufficient heat transfer in a radial direction between the outer tube and the inner tube and vice versa. Consequently, when considered in a circumferential direction an inhomogeneous distribution of temperature may arise in such a tube structure. The inhomogeneous temperature distribution in turn may lead to an earlier failure of the tube structure and furthermore may lead to misreading of a sensor placed in the space.

Thus, there is a need in the art to provide a tube structure having a space in order to accommodate a signal line and/or a sensor while simultaneously guaranteeing a homogeneous thermal conductivity between the outer tube and the inner tube when viewed in a circumferential direction of the tube structure.

SUMMARY

One aspect of the present disclosure relates to a tube structure comprising an inner tube of metal and an outer tube of metal, wherein the inner tube extends in the outer tube, and wherein either the inner tube and the outer tube are mechanically tight fitted over the entire length of the inner tube, at least one space in a radial direction of the tube structure in the form of a groove extends at least in an outer surface of the inner tube or in an inner surface of the outer tube, and the at least one space extends in a longitudinal direction of the inner tube and over an entire longitudinal extension of the inner tube, or a spacer tube is located between the inner tube and the outer tube, the inner tube, the outer tube and the spacer tube are mechanically tight fitted over the entire length of the spacer tube, the spacer tube comprises at least one space in the form a slit extending in a radial direction of the tube structure from an outer surface of the inner tube to an inner surface of the outer tube, the at least one space extends in a longitudinal direction of the spacer tube and over an entire longitudinal extension of the spacer tube, and wherein the at least one space is at least partially filled with a thermal interface material providing a thermal contact between the outer tube and the inner tube.

According to the present disclosure, a tube structure providing a space in order to accommodate a signal line and/or a sensor may be formed in two alternative ways. Both designs comprise an inner tube and an outer tube.

In a first design, the inner tube extends in the outer tube, wherein at least in an outer surface of the inner tube or in an inner surface of the outer tube a groove is formed. This groove forms the space to accommodate the signal line and/or the sensor. The groove extends in a longitudinal direction of the inner tube and over an entire longitudinal extension of the inner tube. The inner tube and the outer tube are mechanically tight fitted over the entire length of the inner tube and thus form an integrated tube structure.

Alternatively, a spacer tube may be located between the inner tube and the outer tube, wherein the spacer tube comprises a slit extending the radial direction of the tube structure from an outer surface of the inner tube to an inner surface of the outer tube. This slit then is the space in order to accommodate the signal line and/or the sensor. Again, in this embodiment the inner tube, the outer tube and the spacer tube are mechanically tight fitted over the entire length of the spacer tube in order to form an integrated tube structure.

In order to avoid that an air gap is generated in the space provided by the groove or by the slit, the space according to the present disclosure is at least partially filled with a thermal interface material providing a thermal contact between the outer tube and the inner tube and thus providing an approximately homogeneous thermal conductivity in a radial direction when considered over the circumference of the tube structure.

A thermal interface material (shortened T. I. M) describes any material that is inserted between two parts in order to enhance the thermal coupling between these two components.

Filling the space, formed either by the groove or by the slit, with a thermal interface material enhances the thermal conductivity of the tube structure between the inner tube and the outer tube at the circumferential position where the groove or the slit is located. A major effect of the thermal interface material is to avoid that the groove or the slit is filled with air gaps.

In an embodiment of the present disclosure, the thermal interface material is a thermal paste or a casted metal.

In an embodiment, wherein the thermal interface material is a casted metal, this casted metal may be chosen from a group consisting of lead (Pb), tin (Sn), copper (Cu) and a combination thereof.

A thermal paste in the sense of the present disclosure is also commonly called a thermal grease, a CPU grease, a heat paste, a heat sink compound, a heat sink paste, a thermal compound or a thermal gel.

A thermal paste is a kind of a thermally conductive compound which is commonly used as an interface between heat sinks and heat sources. The main role of a thermal paste is to eliminate air gaps in the groove or slit so as to maximize the heat transfer between the outer tube and the inner tube.

In an embodiment, the thermal paste is the thermally conductive compound containing a liquid matrix material and a thermally conductive filler.

In an embodiment, the matrix material is chosen from a group consisting of an epoxy, a silicon, an urethane, an acrylate, a solvent base system, a hot melt adhesive and a combination thereof.

In an embodiment, the filler is chosen from a group consisting of a metal, an aluminium oxide, a boron nitride, a zinc oxide, an aluminium nitride, a titanium oxide and a combination thereof.

In an embodiment of the present disclosure, the thermal conductivity of the thermal interface material is 1 Watts/(meter*Kelvin) [W/(m*K)] or more or is 2 W/(m*K) or more.

However, while these complex material combinations are suitable as a thermal paste to be used for the present disclosure even a toothpaste may qualify as a thermal paste in order to enhance thermal conductivity between the inner tube and the outer tube of the tube structure according to the present disclosure.

In an embodiment of the present disclosure, the inner tube and the outer tube and optionally the spacer tube extends concentrically with respect to each other.

In principle, the spacer tube could be made of any material providing the required stability, thus the material may be selected from both plastic and metallic materials.

In a further embodiment of the disclosure, the inner tube and/or the spacer tube and/or the outer tube are manufactured from a metal chosen from a group consisting of steel, carbon steel, stainless steel, manganese steel, a nickel based alloy, aluminium (Al), an Al-based alloy, copper (Cu), a Cu-based alloy, zirconium (Zr), a Zr-based alloy, titanium (Ti), a Ti-based alloy, an iron-chromium-aluminium (Fe-CrAl) alloy, ferritic steel and a combination thereof.

It shall be understood that the hollows, which are used to provide or manufacture the inner tube and/or the spacer tube and/or the outer tube, in an embodiment are made of a metal chosen from a group consisting of steel, carbon steel, stainless steel, manganese steel, a nickel based alloy, aluminium (Al), a Al-based alloy, copper (Cu), a Cu-based alloy, zirconium (Zr), a Zr-based alloy, titanium (Ti), a Ti-based alloy, an iron-chromium-aluminium (FeCrAl) alloy, ferritic steel and a combination thereof.

Furthermore, it shall be understood that generally the material of the inner tube and/or the spacer tube and/or the outer tube may be chosen independently from each other. In an embodiment of the present disclosure, the inner tube and the outer tube, and optionally the spacer tube, consist of an identical material. In an alternative embodiment, the outer tube and the inner tube comprise materials being different from each other. The latter is advantageous as this way different properties of the materials for the outer tube and for the inner tube may be provided, which can be combined arbitrarily in order to obtain a tube structure adopted for a particular application. In another embodiment, the inner tube and the outer tube are made of a first material and the spacer tube is made of a second material, wherein the first material and the second material are different from each other. In another embodiment, the inner tube and the outer tube are made of the same material.

In an embodiment of the present disclosure the inner tube and/or the spacer tube and/or the outer tube is a seamless tube or a welded tube.

Furthermore, under an aspect of the present disclosure, a system is suggested comprising the tube structure as it has been described hereinabove and hereinafter and according to the embodiments as described hereinabove and hereinafter and at least one signal line located in the at least one space, wherein the at least one signal line extends in the longitudinal direction of the tube structure.

A signal line in the sense of the present disclosure is understood as any line being able to transmit a signal, i.e. information, from a transmitter to a receiver. So, in an embodiment of the present disclosure, the signal line is chosen from a group consisting of a line for an electrical signal, a line for an electromagnetic signal, a line for an optical signal and a combination thereof. An example for a signal line is an isolated electrically conductive wire or an optical glass fiber.

In an embodiment of the disclosure, the system furthermore comprises at least one sensor operatively connected to the at least one signal line, wherein the at least one sensor is located between the outer surface of the inner tube and the inner surface of the outer tube.

In an embodiment, the at least one sensor is located in the at least one space formed by the groove or the slit.

However, in an alternative embodiment at least one recess is provided at least in the inner tube or the outer tube or if applicable in the spacer tube, wherein the at least one recess connects to the at least one space formed by the groove or the slit, and wherein at least one sensor connected to a signal line is located at least partially in the at least one recess.

A recess connecting to the space in the sense of the present disclosure means that the space and the recess providing continuous volume to accommodate the at least one sensor and the at least one signal line. In an embodiment, a recess may be formed by widening the groove or the slit at a certain position in a longitudinal direction of the tube structure. In an embodiment of the present disclosure, the sensor is chosen from a group consisting of an acceleration sensor, vibration sensor, a conductivity sensor, a pressure sensor, a temperature sensor, a strain gauge, a corrosion sensor, a magnetic field sensor, a heat flux sensor, a talk sensor and a combination thereof.

In an embodiment of the disclosure, the signal line and/or the sensor are glued into the groove or slit and/or the recess by the aid of an adhesive. Such a gluing fixes the sensor and/or the signal line in the space or in the recess during manufacturing of the tube structure. In another embodiment, the signal line and/or the sensor are welded into the space and/or the recess.

Under another aspect of the present disclosure, a method for manufacturing a tube structure is provided comprising the steps provyding an inner tube of metal,
providing an outer tube of metal, and either
inserting the inner tube into the tube such that the inner tube extends in the outer tube,
providing at least one space in the form a groove extending in a radial direction of the tube structure at least in the outer surface of the inner tube or in an inner surface of the outer tube, wherein the at least one space extends in a longitudinal direction of the inner tube and over an entire longitudinal extension of the inner tube, and
mechanically tight fitting the inner tube and the outer tube over the entire length of the inner tube, or providing a spacer tube with at least one space in the form of a slit extending in a longitudinal direction of the spacer tube,
mounting the spacer tube on an outer surface of the inner tube,
inserting the inner tube and the spacer tube into the outer tube such that the inner tube and spacer tube extend in the outer tube and such that the at least one space extends in a radial direction of the tube structure between the outer surface of the inner tube and the inner surface of the outer tube, and
mechanically tight fitting the inner tube, the outer tube and the spacer tube over the entire length of the spacer tube, wherein the method further comprises the step of
at least partially filling the at least one space with a thermal interface material providing a thermal contact between the outer tube and the inner tube.

The order of the steps for manufacturing the tube structure according to the present disclosure will depend on the type of tube structure to be manufactured. There is a distinction between two principle designs of the tube structure, namely a tube structure having an inner tube and an outer tube, wherein the outer surface of the inner tube and the inner tube surface of the outer tube are in direct mechanical contact with each other, and wherein the space in form of the groove is provided in the inner surface of the outer tube and/or the outer surface of the inner tube.

In an embodiment of the present disclosure the groove may be machined into the outer surface of the inner tube or into the inner surface of the outer tube after extruding and milling the inner tube and the outer tube, respectively.

In this case the groove may for example be manufactured by chip removing machining of either of the surfaces of the inner tube or the outer tube or both.

In an alternative embodiment, the groove may be provided during a drawing process for forming the inner tube and the outer tube, respectively out of a hollow.

If the groove is to be provided in the outer surface of the inner tube, then during drawing of a hollow into the inner tube the drawing matrix comprises a protrusion to shape the groove in the outer surface. If alternatively, the outer tube is to be provided with a groove on its inner surface then during the drawing process for forming a hollow into the outer tube a protrusion is provided on a mandrel used during the drawing process.

It is apparent that of course a groove may be provided each on the inner surface of the outer tube and on the outer surface of the inner tube.

After providing the inner tube and the outer tube, the inner tube is inserted into the outer tube and finally the inner tube and the outer tube are drawn together through a drawing matrix in order to provide the required mechanical tight fitting of the inner tube and the outer tube over the entire length of the inner tube.

In an embodiment, wherein the tube structure in addition to the inner tube and the outer tube comprises a spacer tube extending between the inner tube and the outer tube, the spacer tube has to be provided with at least one space in the form of a slit.

In an embodiment of the present disclosure, providing the spacer tube includes machining of the spacer tube, in particular machining of the spacer tube by chip removing machining, to form the at least one space in the form of the slit.

The machining of the spacer tube to form the at least one space in form of a slit could be for example effected by milling, cutting or laser machining.

In an embodiment of the present disclosure, mounting of the spacer tube on the outer surface of the inner tube includes inserting the inner tube into the spacer tube.

In a further embodiment, mounting of the spacer tube on the outer surface of the inner tube includes welding or gluing of at least two separate segments of the spacer tube onto the outer surface of the inner tube. It is apparent that by welding or gluing of separate segments of the spacer tube will be required once the spacer tube provides a plurality of slits extending over the entire longitudinal direction of the spacer tube.

In an embodiment of the present disclosure, the spacer tube prior to the mounting onto the inner tube has an inner diameter being smaller than the outer diameter of the inner tube. Due to the slit formed in the spacer tube, still the inner tube can be inserted into the spacer tube bending the spacer tube slightly open. By this way, a tight fit between the spacer tube and the inner tube is provided, such that no further steps are required to provide this tight fit.

In an embodiment of the present disclosure, the thermal interface material is filled into the at least one space prior to mechanically tight fitting the inner tube and the outer tube or the inner tube, the outer tube and the spacer tube.

This filling may either occur prior to inserting the inner tube into the outer tube or the inner tube and the spacer tube into the outer tube or even after inserting the tubes.

If the thermal interface material is filled into the at least one space after inserting the inner tube into the outer tube or the inner tube and the spacer tube into the outer tube, this filling may occur either prior or after mechanically tight fitting the tubes.

In an embodiment of the present disclosure, the thermal interface material is injected into the at least one space from an end of the tube structure.

In an embodiment of the present disclosure, the thermal interface material is filled into the at least one space after providing the inner tube with the groove or after providing the inner tube and the outer tube with the slit and prior to inserting the inner tube or the inner tube with the spacer tube into the outer tube.

In an embodiment of the present disclosure, mechanical tight fitting of the inner tube and the outer tube or the inner tube, the spacer tube and the outer tube is achieved by drawing the inner tube and the outer tube, or the inner tube, the spacer tube and the outer tube together through a drawing dye within a tool surface forming an outer surface of the outer tube.

In an embodiment, a tool diameter of an inner tool surface of the drawing dye is chosen such that by the drawing an inner diameter of the outer tube is reduced such that after drawing the outer tube is either tight fitted on the inner tube or is tight fitted on the spacer tube and the inner tube.

In a further embodiment of the present disclosure, a method for manufacturing a system comprising a tube structure, at least one signal line and at least one sensor operatively connected to the at least one signal line is provided, wherein the method includes the steps of the method for manufacturing a tube structure as it has been discussed in embodiments hereinabove and hereinafter and wherein the at least one signal line and the at least one sensor are inserted into the at least one space prior to the step of filling the at least one space with a thermal interface material.

In principle, the present disclosure also covers a method for manufacturing a system comprising a tube structure as it has been described before and at least one signal line, but no sensor.

In an embodiment, a recess may be formed either in the inner tube or the outer tube or in the spacer tube by widening the groove or the slit at a certain position in a longitudinal direction of the tube structure. It is apparent that in an embodiment, wherein a sensor is included, the sensor may be connected to the signal line and located in the recess formed.

In an embodiment, the at least one signal line and once applicable the at least one sensor are placed in the slit after inserting the inner tube into the spacer tube and before inserting the inner tube and the spacer tube together in the outer tube.

BRIEF DESCRIPTION OF THE FIGURES

The foregoing as well as the following detailed description of the embodiments will be better understood when read in conjunction with the appended drawings. It should be understood that the embodiments depicted are not limited to the precise arrangements and instrumentalities shown.

DETAILED DESCRIPTION

In the figures, identical elements have been denoted by identical reference numbers.

Figure 1:
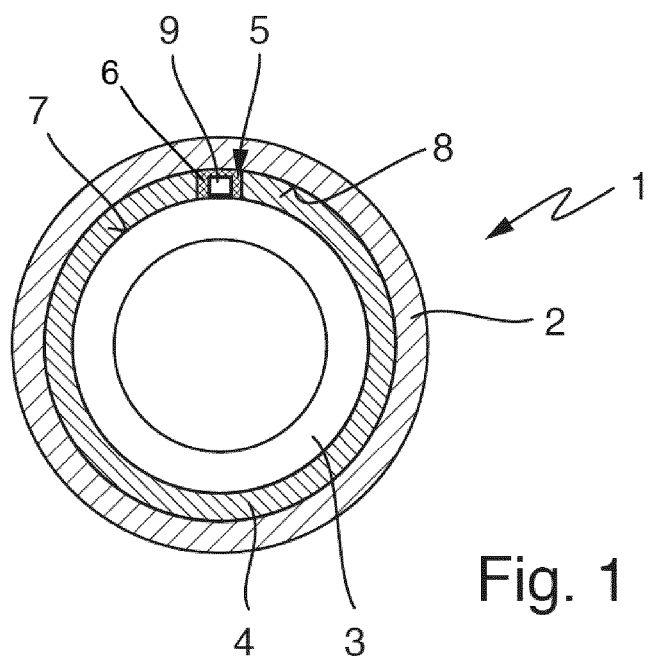
FIG. 1 is a schematic cross-sectional view of a first embodiment of a system with a tube structure and a signal line according to the present disclosure.
Figure 2:
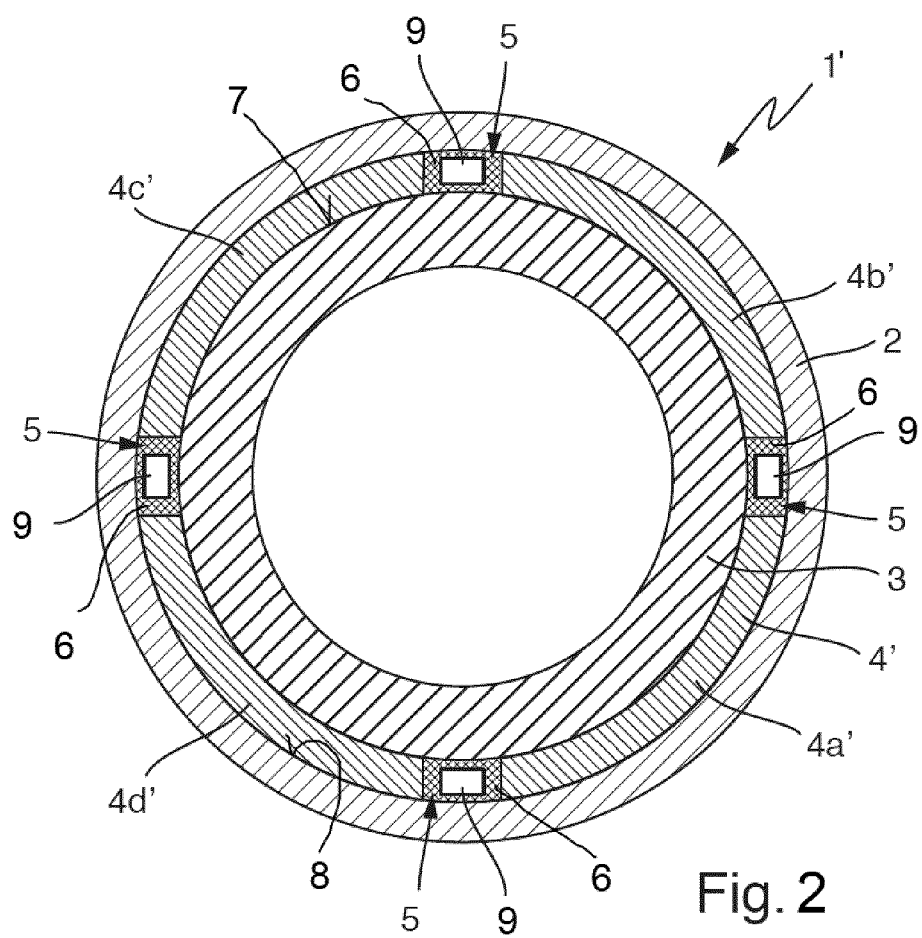
FIG. 2 is a schematic cross-sectional view of an alternative embodiment of a system with a tube structure and a signal line according to the present disclosure.
Figure 3:
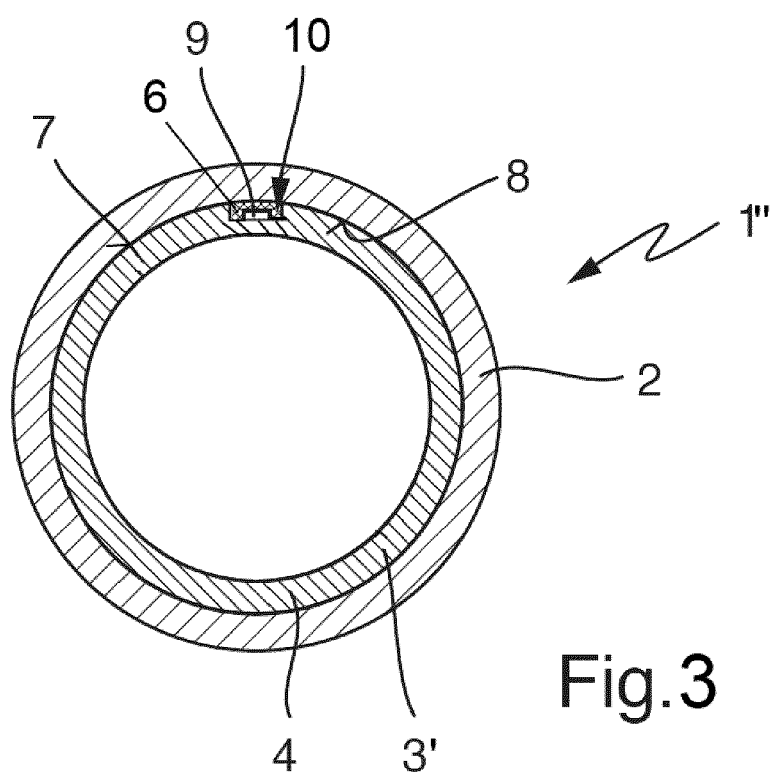
FIG. 3 is a schematic cross-sectional view of a further embodiment of a system with a tube structure and a signal line according to the present disclosure.

FIGS. 1 to 3 show schematic cross-sectional views of system with a tube structure according to embodiments of the present disclosure. The cross-sectional views are drawn in a plane perpendicular to the longitudinal extension of the respective tube structures.

A system according to the present disclosure always comprises a tube structure 1, 1', 1" having an outer tube 2 and an inner tube 3, 3'. The system further comprises a signal line 9.

FIGS. 1 and 2 show embodiments wherein the signal line is placed in a space formed by a slit 5 in an additional spacer tube 4, 4'. In contrast, in the embodiment of FIG. 3, the space to accommodate the signal line 9 is provided as a groove 10 in an outer surface 7 of the inner tube 3'.

In all embodiments depicted, the inner tube 3, 3' is a cold drawn stainless steel tube as is the outer tube 2.

In the embodiments of FIGS. 1 and 2, an additional spacer tube 4, 4' is provided which guarantees a constant distance between the outer tube 2 and the inner tube 3. The spacer tube 4, 4' is also provided by a seamless cold drawn stainless steel tube. After cold drawing, a slit 5 has been cut into the spacer tube 4 of FIG. 1.

Instead of cutting, the cold drawn spacer tube with a single cut, the spacer tube is cut twice such that a segment can be removed from the tube. Removing the material section from the spacer tube 4 guarantees that the slit 5 forms a space extending in a radial direction from the outer surface 7 of the inner tube 3 to the inner surface 8 of the outer tube 2. The slit 5 thus provides a space being large enough to place a signal line 9 in the slit 5.

The inner diameters and the outer diameters of the inner tube 3, the spacer tube 4 and the outer tube 2 match each other such that a lose fitting is provided, wherein the inner tube 3 can be pushed or moved into the spacer tube 4 manually as well as the spacer tube 4 together with the inner tube 3 can be pushed manually into the outer tube 2.

For the embodiment of the tube structure 1 depicted in FIG. 1, in a first step the inner tube is inserted into the spacer tube 4, in a second step the signal line 9 is placed in the slit 5. Then, in a third step a thermal interface material 6 is filled into the remaining space between the signal line 9, the side walls of the slit 5 and the outer surface 7 of the inner tube 3.

In all embodiments depicted in FIGS. 1 to 3, the thermal interface material 6 is a thermal paste comprising epoxy as liquid matrix material and aluminium oxide as a filler. The material chosen for the thermal interface material has a thermal conductivity of 1.5 W/(m*K).

In a fourth step, the inner tube 3 and the spacer tube 4 including the signal line 9 and the thermal paste 6 are inserted into the outer tube 2.

Furthermore, at the end of the manufacturing steps, the tube structure 1 must be such that the outer tube 2, the spacer tube 4 and the inner tube 3 are tight fitted with respect to each other.

Guaranteed tight fit is achieved during a fifth step by cold drawing the tube structure formed of the inner tube 3, the spacer tube 4 and the outer tube 2 arranged concentrically with respect to each other, but loosely fitted together through a drawing dye.

An inner tool diameter of this drawing dye is smaller than the outer diameter of the outer tube 2 before the drawing step. By reducing the outer diameter of the outer tube 2 when cold drawing the tube structure 1, the outer tube 2 is drawn onto a core formed by the inner tube 3 and the spacer tube 4. The slit has a size in a circumferential direction which is large enough such that the slit even after cold drawing of the structure forms a space extending in a radial direction of the tube structure from the outer surface 7 of the inner tube 3 to the inner surface 8 of the outer tube 2. Consequently, even after cold drawing the slit is wide enough to accommodate the signal line 9 as well as the thermal paste 6.

FIG. 2 shows an alternative embodiment of a system with a tube structure 1', wherein the spacer tube 4' comprises four slits 5. Consequently, the spacer tube 4' is provided by four segments 4A' to 4D'.

It should be pointed out that in this design, it is advantageous if each of the segments $4a'$ to $4d'$ is fixed, e.g. by spot welding, on the inner tube 3 before inserting the signal lines 9 as well as the thermal paste 6 and before inserting the inner tube 3 and the spacer tube 4' into the outer tube 2.

In both embodiments of FIGS. 1 and 2, each slit 5 in the spacer tube 4, 4' has an extension in a circumferential direction of the tube structure 1, 1' such that not only a signal line 9 may be accommodated in the slit 5, but also a sensor can be placed at distinct longitudinal positions of the tube structure 1, 1' in order to provide the required measurements indicating integrity of the inner tube 3.

Before inserting the inner tube 3 and optionally the spacer tube 4, 4' into the outer tube 2, the signal line(s) as well as the sensor(s), were applicable, are inserted into the slit 5 and fixed therein to allow a reliable and quick assembly of the tube structure (1, 1').

The tube structure 1" according to the embodiment shown in FIG. 3 differs from the embodiments of the tube structures 1, 1' of FIGS. 1 and 2 in that it lacks a spacer tube. Instead the outer surface 7 of the inner tube 3' and the inner surface 8 of the outer tube 2 are in direct mechanical contact.

In order to accommodate the signal line 9 between the inner tube 3' and the outer tube 2 a groove 10 has been machined into the outer surface 7 of the inner tube 3' by chip removing machining.

After positioning the signal line 9 in the groove 10 the rest of the groove 10 has been filled with the thermal paste 6 in order to avoid air gaps and to enhance thermal conductivity in a radial direction of the tube structure 1".

After inserting the inner tube 3' with the signal line 9 and the thermal paste 6 into the outer tube 2 the entire structure has been drawn through a drawing dye in order to mechanically tight fit the outer tube 2 and the inner tube 3' to generate the integrated tube structure 1".

For purposes of the original disclosure, it is noted that all features that become apparent for a person skilled in the art from the present description, the figures and the claims even if they have only been described with reference to particular further features can be combined either on their own or in arbitrary combinations with other features or groups of features disclosed herein as far as such combinations are not explicitly excluded or technical facts exclude such combinations or make them useless. An extensive, explicit description of each possible combination of features has only been omitted in order to provide a short and readable description. While the disclosure has been shown in detail in the figures and the above description, this description is only an example and is not considered to restrict the scope of protection as it is defined by the claims. The disclosure is not restricted to the disclosed embodiments.

Modifications to the disclosed embodiments are apparent for a person skilled in the art from the drawings, the description and the attached claims. In the claims, the word "comprising" does not exclude other elements or steps and the undefined article "a" does not exclude a plurality. The mere fact that some features have been claimed in different claims does not exclude their combination. Reference numbers in the claims are not considered to restrict the scope of protection.

REFERENCE NUMERALS

1, 1', 1" tube structure
2 outer tube
3, 3' inner tube
4, 4' spacer tube
4a' to 4d' segment of the spacer tube
5 slit
6 thermal interface material
7 outer surface of the inner tube 3, 3'
8 inner surface of the outer tube 2
9 signal line
10 groove

The invention claimed is:

1. A tube structure comprising:
    an inner tube of metal; and
    an outer tube of metal,
    wherein the inner tube extends in the outer tube, wherein either
        the inner tube and the outer tube are mechanically tight fitted over an entire length of the inner tube
        at least one space in a radial direction of the tube structure in the form of a groove extends at least in an outer surface of the inner tube or in an inner surface of the outer tube, and
        the at least one space extends in a longitudinal direction of the inner tube and over an entire longitudinal extension of the inner tube,
    or
        a spacer tube is located between the inner tube and the outer tube,
        the inner tube, the outer tube and the spacer tube are mechanically tight fitted over the entire length of the spacer tube,
        the spacer tube comprises at least one space in the form of a slit extending in a radial direction of the tube structure from an outer surface of the inner tube to an inner surface of the outer tube, and
        the at least one space extends in a longitudinal direction of the spacer tube and over an entire longitudinal extension of the spacer tube,
    wherein the at least one space is at least partially filled with a thermal interface material providing a thermal contact between the outer tube and the inner tube,
    wherein the thermal interface material is a thermal paste or a casted metal, and
    wherein the thermal paste is a thermally conductive compound containing a liquid matrix material and a thermally conductive filler.

2. The tube structure according to claim 1, wherein the matrix material is chosen from a group consisting of an epoxy, a silicone, an urethane, an acrylate, a solvent based system, a hot-melt adhesive and a combination thereof.

3. The tube structure according to claim 1, wherein the filler is chosen from a group consisting of a metal, an aluminium oxide, a boron nitride, a zinc oxide, an aluminium nitride, a titanium oxide and a combination thereof.

4. The tube structure according to claim 1, wherein the thermal conductivity of the thermal interface material is 1 W/(m*K) or more or is 2 W/(m*K)/or more.

5. A system comprising:
    the tube structure according to claim 1; and
    at least one signal line located in the at least one space, wherein the at least one signal line extends in the longitudinal direction of the tube structure.

6. The system according to claim 5, wherein the at least one signal line is chosen from a group consisting of a line for an electrical signal, a line for an electromagnetic signal, a line for an optical signal and a combination thereof.

7. The system according to claim 5, wherein the system comprises at least one sensor operatively connected to the at least one signal line, and wherein the at least one sensor is located between the outer surface of the inner tube and the inner surface of the outer tube.

8. The system according to claim 7, wherein the at least one sensor is located in the at least one space.

9. The system according to claim 8, wherein the at least one sensor is chosen from a group consisting of an acceleration sensor, a vibration sensor, a conductivity sensor, a pressure sensor, a temperature sensor, a strain gauge, a corrosion sensor, a magnetic field sensor, a heat flux sensor, a torque sensor and a combination thereof.

10. A method for manufacturing the tube structure of claim 1, comprising the steps:
providing an inner tube of metal;
providing an outer tube of metal; and
either
  inserting the inner tube into the outer tube such that the inner tube extends in the outer tube,
  providing at least one space in the form of a groove extending in a radial direction of the tube structure at least in an outer surface of the inner tube or in an inner surface of the outer tube, wherein the at least one space extends in a longitudinal direction of the inner tube and over an entire longitudinal extension of the inner tube mechanically tight fitting the inner tube and the outer tube over the entire length of the inner tube,
or
  providing a spacer tube with at least one space in the form of a slit extending in a longitudinal direction of the spacer tube,
  mounting the spacer tube on an outer surface of the inner tube and
  inserting the inner tube and the spacer tube into the outer tube such that the inner tube and the spacer tube extend in the outer tube and such that the at least one space extends in a radial direction of the tube structure between the outer surface of the inner tube and an inner surface of the outer tube, and
  mechanically tight fitting the inner tube, the outer tube and the spacer tube over the entire length of the spacer tube,
wherein the method comprises the step of at least partially filling the at least one space with a thermal interface material providing a thermal contact between the outer tube and the inner tube.

11. The method according to claim 10, wherein the thermal interface material is filled into the at least one space prior to mechanically tight fitting the inner tube and the outer tube or the inner tube, the outer tube and the spacer tube.

12. The method according to claim 11, wherein the inner tube and the outer tube or the inner tube, the spacer tube and the outer tube are drawn together through a drawing die with an inner tool surface forming an outer surface of the outer tube.

13. A method for manufacturing a system comprising a tube structure, at least one signal line and at least one sensor operatively connected to the at least one signal line, wherein the method includes the steps of the method according to claim 10, and wherein the at least one signal line and the at least one sensor are inserted into the at least one space prior to the step of filling the at least one space with the thermal interface material.

14. The tube structure according to claim 2, wherein the filler is chosen from a group consisting of a metal, an aluminium oxide, a boron nitride, a zinc oxide, an aluminium nitride, a titanium oxide and a combination thereof.

15. The system according to claim 6, wherein the system comprises at least one sensor operatively connected to the at least one signal line, and wherein the at least one sensor is located between the outer surface of the inner tube and the inner surface of the outer tube.

16. The system according to claim 7, wherein the at least one sensor is chosen from a group consisting of an acceleration sensor, a vibration sensor, a conductivity sensor, a pressure sensor, a temperature sensor, a strain gauge, a corrosion sensor, a magnetic field sensor, a heat flux sensor, a torque sensor and a combination thereof.

17. The method according to claim 10, wherein the inner tube and the outer tube or the inner tube, the spacer tube and the outer tube are drawn together through a drawing die with an inner tool surface forming an outer surface of the outer tube.

* * * * *